(12) United States Patent
Smith

(10) Patent No.: US 6,771,971 B2
(45) Date of Patent: Aug. 3, 2004

(54) SUBSCRIBER INFORMATION SERVICE CENTER (SISC)

(75) Inventor: Steven W. Smith, Dallas, TX (US)

(73) Assignee: SWS Development, L.L.C., Dallas, TX (US)

( * ) Notice: Subject to any disclaimer, the term of this patent is extended or adjusted under 35 U.S.C. 154(b) by 579 days.

(21) Appl. No.: 09/764,696

(22) Filed: Jan. 18, 2001

(65) Prior Publication Data

US 2002/0042277 A1 Apr. 11, 2002

Related U.S. Application Data

(63) Continuation-in-part of application No. 09/686,598, filed on Oct. 10, 2000.

(51) Int. Cl.[7] .................................................. H04Q 7/20
(52) U.S. Cl. ........................ 455/456.1; 455/414.2; 455/456.3; 701/208
(58) Field of Search ...................... 455/456.1–456.6, 455/414.1, 414.2, 457, 433, 440; 701/208, 209, 213, 215

(56) References Cited

U.S. PATENT DOCUMENTS

| | | | | |
|---|---|---|---|---|
| 5,485,163 A | * | 1/1996 | Singer et al. ............... 342/457 |
| 5,519,760 A | * | 5/1996 | Borkowski et al. ............ 379/59 |
| 5,625,668 A | * | 4/1997 | Loomis et al. ............ 455/456.5 |
| 5,946,626 A | * | 8/1999 | Foladare et al. ............. 455/456 |
| 6,061,561 A | * | 5/2000 | Alanara et al. .............. 455/422 |
| 6,161,008 A | * | 12/2000 | Lee et al. .................... 455/414 |
| 6,330,454 B1 | * | 12/2001 | Verdonk ................... 455/456.2 |
| 6,343,074 B1 | * | 1/2002 | Pickett ....................... 370/353 |
| 6,349,206 B1 | * | 2/2002 | Reichelt et al. ............. 455/421 |
| 6,400,707 B1 | * | 6/2002 | Baum et al. ................ 370/352 |
| 6,434,126 B1 | * | 8/2002 | Park .......................... 370/328 |
| 6,456,852 B2 | * | 9/2002 | Bar et al. ................. 455/456.1 |

* cited by examiner

Primary Examiner—William Trost
Assistant Examiner—Stephen D'Agosta

(57) ABSTRACT

A Subscriber Information Service Center (SISC) in a wireless telecommunications network provides location and status information about identified mobile subscribers to a requesting subscriber. The requesting subscriber may access the SISC by e-mail. The SISC retrieves the location information from the mobile subscriber's HLR, and returns the requested information by e-mail or by posting the information on a Web site associated with the SISC. A SIP proxy in the SISC enables a second-generation mobile subscriber to request information for other mobile subscribers. The SISC may also retrieve status information from the MSC serving the mobile subscriber relating to any ongoing call by the mobile subscriber.

26 Claims, 7 Drawing Sheets

COMPANY NAME

| EMPLOYEE | LOCATION | LAST UPDATE | PREVIOUS LOCATION | MOVING OR STATIONARY | ONGOING CALL |
|---|---|---|---|---|---|
| CRAIG | RICHARDSON | 3:00 pm | N. DALLAS | MOVING | NO |
| ELLEN | PLANO | 3:05 pm | RICHARDSON | STATIONARY | YES |
| CAROLYN | DUNCANVILLE | 1:30 pm | OAK CLIFF | N/A | INACTIVE |
| ... | ... | ... | ... | ... | ... |
| STEVE | CHICAGO | 3:08 pm | DFW AIRPORT | MOVING | YES |

*FIG. 7*

SUBSCRIBER INFORMATION SERVICE CENTER (SISC)

RELATED APPLICATIONS

This application is a Continuation-in-Part of U.S. patent application Ser. No. 09/686,598 filed Oct. 10, 2000.

BACKGROUND OF THE INVENTION

1. Technical Field of the Invention This invention relates to wireless telecommunication systems and, more particularly, to a system and method that enables a subscriber to obtain location and other status information about one or more designated mobile subscribers through a Subscriber Information Service Center (SISC).

2. Description of Related Art

There are many times that it would be useful for a calling subscriber to know the general location of a called mobile subscriber. Presently, when a calling subscriber calls a mobile subscriber, the calling subscriber does not know ahead of time where the mobile subscriber is located. Therefore, if the mobile subscriber has moved out of the local area, the call is connected as a long distance call, even when the calling subscriber did not intend to place a long distance call. Additionally, many subscribers will choose not to place a call if they know that the subscriber they want to call is traveling, and may not be back in town yet. Since they have no way of checking the mobile subscriber's location, they do not place the call, and the system operator loses revenue.

Businesses with traveling salespeople or delivery people also have a need to keep track of where their personnel are located. For salespeople, it is often intrusive to receive a call during a sales meeting with a potential customer. For delivery people, it may be inconvenient or dangerous for them to try to answer a telephone call when delivering goods. Therefore, it would be advantageous for businesses to be able to locate their mobile personnel without having to place a call.

The prior art is replete with patents on methods of locating mobile stations. However, all of these prior art patents have been oriented towards methods of determining a precise location of the mobile station, for example, to meet 911 emergency location requirements. There is no teaching or suggestion in the prior art of any system or method of providing a subscriber with location and other status information for one or more designated mobile subscribers. The present invention provides such a system and method.

SUMMARY OF THE INVENTION

In one aspect, the present invention is a system in a wireless telecommunications network for providing a first subscriber with location information for a mobile subscriber. The system includes means within the network for receiving an information request from the first subscriber, the information request requesting location information for the mobile subscriber. The system also includes means within the network for determining a location for the mobile subscriber; means within the network for converting the location for the mobile subscriber to a corresponding common geographic name; and means for sending the common geographic name to the first subscriber through a packet-switched network. The packet-switched network may be the Internet, and the information may be posted on a Web site that is accessed by the requesting subscriber to retrieve the information. The requesting subscriber may request information for a plurality of mobile subscribers that are identified in an information profile.

In another aspect, the present invention is a method in a wireless telecommunications network of providing a first subscriber with location information for a mobile subscriber. The method includes the steps of receiving in the network, an information request from the first subscriber, said information request requesting location information for the mobile subscriber; determining within the network, a location for the mobile subscriber; converting within the network, the location for the mobile subscriber to a corresponding common geographic name; and sending the common geographic name to the first subscriber through a packet-switched network. The information request may be in an e-mail message from the first subscriber requesting the information, and the information may be sent to the requesting subscriber via e-mail or by posting the information on a Web page that is accessed by the requesting subscriber.

In another aspect, the present invention is a Subscriber Information Service Center (SISC) in a wireless telecommunications network having a Mobile Switching Center (MSC) serving a mobile subscriber and a Home Location Register (HLR) storing location information for the mobile subscriber. The SISC provides location and status information about the mobile subscriber to a requesting subscriber. The SISC includes a first signaling mechanism for receiving a request for information about the mobile subscriber from the requesting subscriber and sending the requested information to the requesting subscriber over a packet-switched network. A second signaling mechanism retrieves location information for the mobile subscriber from the HLR. The second signaling mechanism may also include means for retrieving from the MSC, status information relating to an ongoing call by the mobile subscriber. The SISC may also include a proxy device that provides an address usable in the packet-data network to the first subscriber, and that maps circuit-switched signaling used by the first subscriber into packet-switched signaling used by the packet-switched network, thereby enabling the first subscriber to request information for the mobile subscriber when the first subscriber is a second-generation (2G) mobile subscriber.

BRIEF DESCRIPTION OF THE DRAWINGS

The invention will be better understood and its numerous objects and advantages will become more apparent to those skilled in the art by reference to the following drawings, in conjunction with the accompanying specification, in which:

FIG. 7 is an illustrative drawing of an exemplary display providing a subscriber with location and other status information on a plurality of designated mobile subscribers.

DETAILED DESCRIPTION OF EMBODIMENTS

The present invention builds upon a Mobile Subscriber Locator Service (MSLS) in which the calling party may input a code such as *LOC and a called party's telephone number, and receive information on the called party's current location (if active) or the last registered location (if inactive). Preferably, the location information includes the common name of the geographic area where the mobile subscriber is located and the time of the last location update. The MSLS is described in co-owned and co-pending U.S. patent application Ser. No. 09/686,598 which is hereby incorporated by reference herein.

The location information does not have to be as precise as the information provided by methods being developed for 911 purposes. The common name of a geographic area, neighborhood, or city is sufficient. For privacy reasons, the service may be available only to those who specifically subscribe to it. Additionally, subscribers to the service may limit the service to providing location information only to subscribers who call from specifically identified originating telephone numbers. As an additional security precaution, an operator may require that a Personal Identification Number (PIN) be entered in order to obtain location information for another subscriber.

Figure 1:
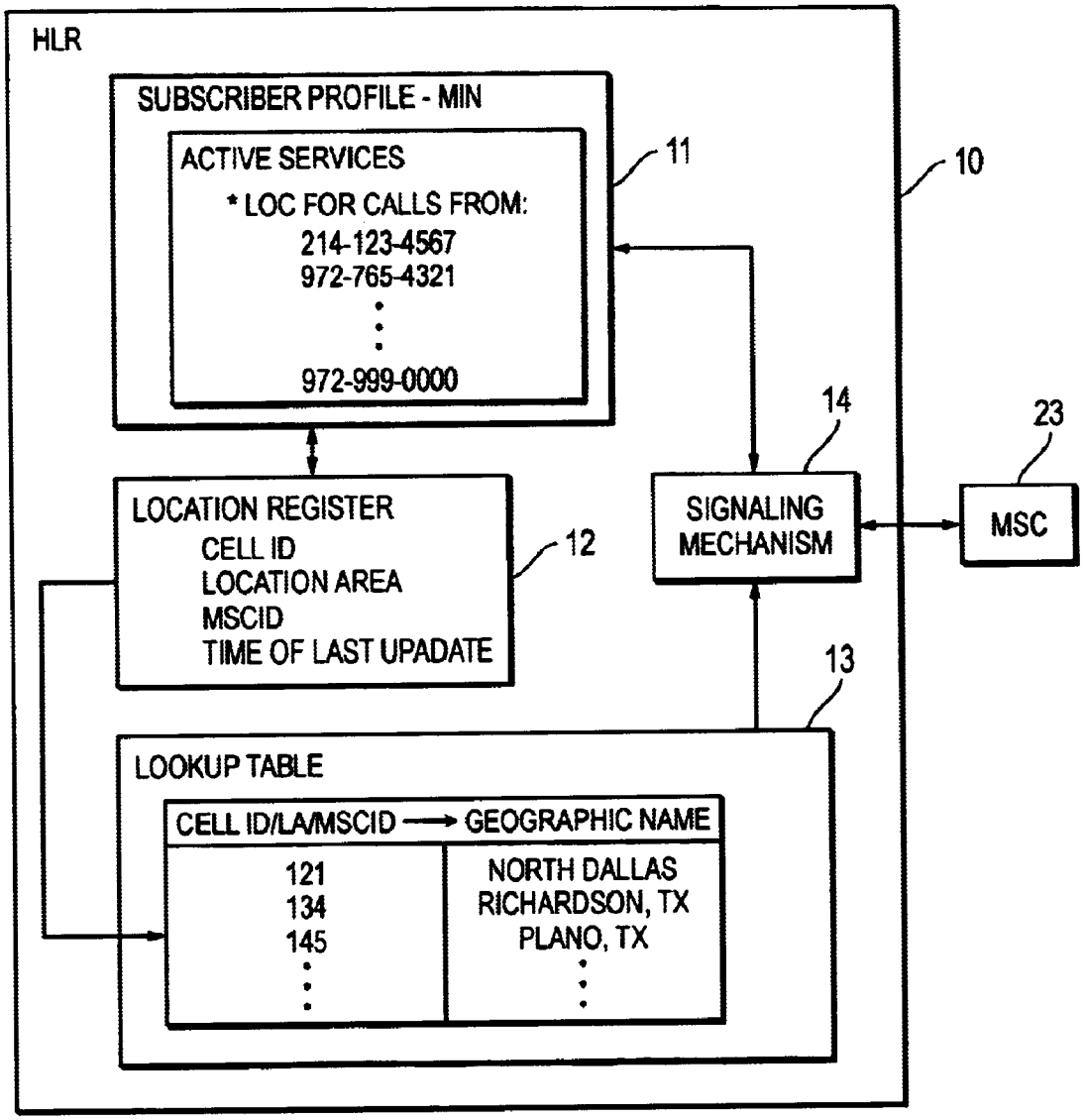
FIG. 1 is a simplified block diagram illustrating the modifications to a Home Location Register (HLR) to implement a Mobile Subscriber Locator Service (MSLS)

FIG. 1 is a simplified block diagram illustrating the modifications to an HLR 10 to implement the Mobile Subscriber Locator Service (MSLS). The HLR includes a subscriber profile 11 in which the *LOC service may be activated or deactivated. Optionally, the service may be activated to provide location information to all calling parties, or the service may be activated to provide location information only to callers from specified telephone numbers.

The HLR also includes a location register 12 which stores location information for the subscriber's MS. The HLR normally stores an MS's location area after the MS registers. The location area is a group of cells in which the system would normally start to page the MS when a call is made to the MS. If the location area is accurate enough for the operator's desires, no paging is necessary. A common name of an area associated with the location area is then reported to the calling subscriber. If more accuracy is desired, the identity of the cell (CellID) in which the MS is currently operating may need to be ascertained. The system may provide this information in one of two ways. First, the location register 12 in the HLR can be modified to store CellIDs after registration instead of (or in addition to) location areas. Second, the called MS can be paged in order to obtain a CellID.

The subscriber's HLR 10 is also modified to include a lookup table 13 that associates CellIDs, Location Areas (LAs), or MSCIDs with the common names of towns, areas of town, or suburbs such as "NORTH DALLAS" or "RICHARDSON". A signaling mechanism 14 communicates with a Mobile Switching Center (MSC) 23.

Figure 2:
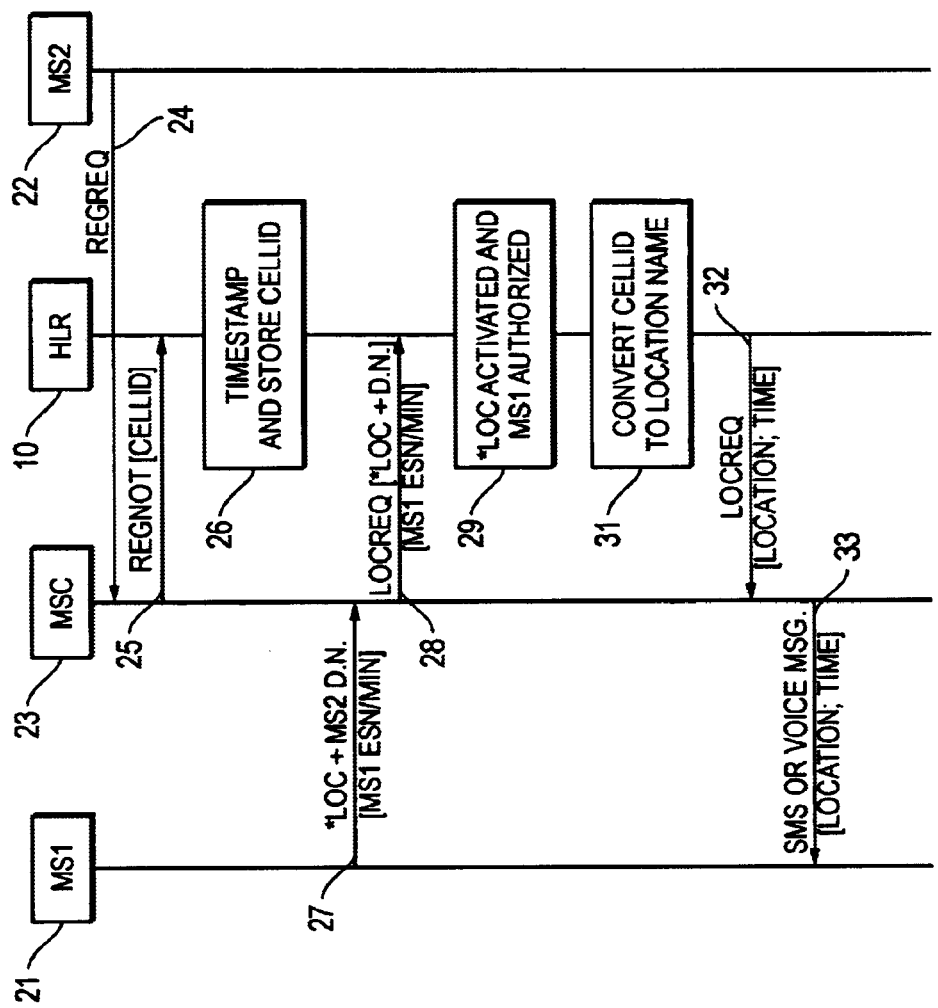
FIG. 2 is a signaling diagram illustrating the steps of an MSLS method when MS1 requests location information for MS2 which is operating locally.

FIG. 2 is a signaling diagram illustrating the steps of an MSLS method when MS1 21 requests location information for MS2 22 which is operating locally within the service area of MSC 23. At 24, MS2 registers with the radio network by sending, for example, a Registration Request (RegReq) message to the serving MSC. At 25, the serving MSC forwards the RegReq message to the HLR 10 and includes a CellID for the cell in which MS2 is operating. Within a local calling area, it may be necessary to store location information with greater resolution than a location area (LA). Therefore, at 26, the HLR timestamps and stores the CellID in the location register 12.

At some later time, as indicated at step 27, the subscriber using MS1 21 enters *LOC and the directory number for MS2 22. The directory number may equate to the Mobile Identification Number (MIN) for MS2 or some other subscriber number that can be associated with MS2. This message also includes an identifier for MS1 such as its Electronic Serial Number (ESN) or its MIN. The MSC 23 sends a message such as a Location Request (LocReq) Invoke message 28 to the HLR requesting location information. The LocReq message includes a *LOC parameter, the digits dialed, and may also include the identity of the calling MS1. At 29, the HLR accesses MS2's subscriber profile and finds that the *LOC service is activated, and that the calling MS1 is a telephone number that is authorized to receive location information. Therefore, at 31, the HLR uses lookup table 13 to convert the CellID for MS2 to a geographic location name.

At 32, the HLR 10 sends a response to the MSC 23 which may be a LocReq Return Result message. The response includes the geographic location information and the time of the last location update. At 33, the MSC sends the location information and the time of the last location update to MS1 21. If MS1 is a digital mobile station, the location information and time of last update may be sent in a Short Message Service (SMS) message. The calling party may also be an analog mobile station or even a landline phone in the Public Switched Telephone Network (PSTN). If the calling party is an analog mobile station or a PSTN telephone, the location information and time of last update may be sent in a voice announcement.

Figure 3:
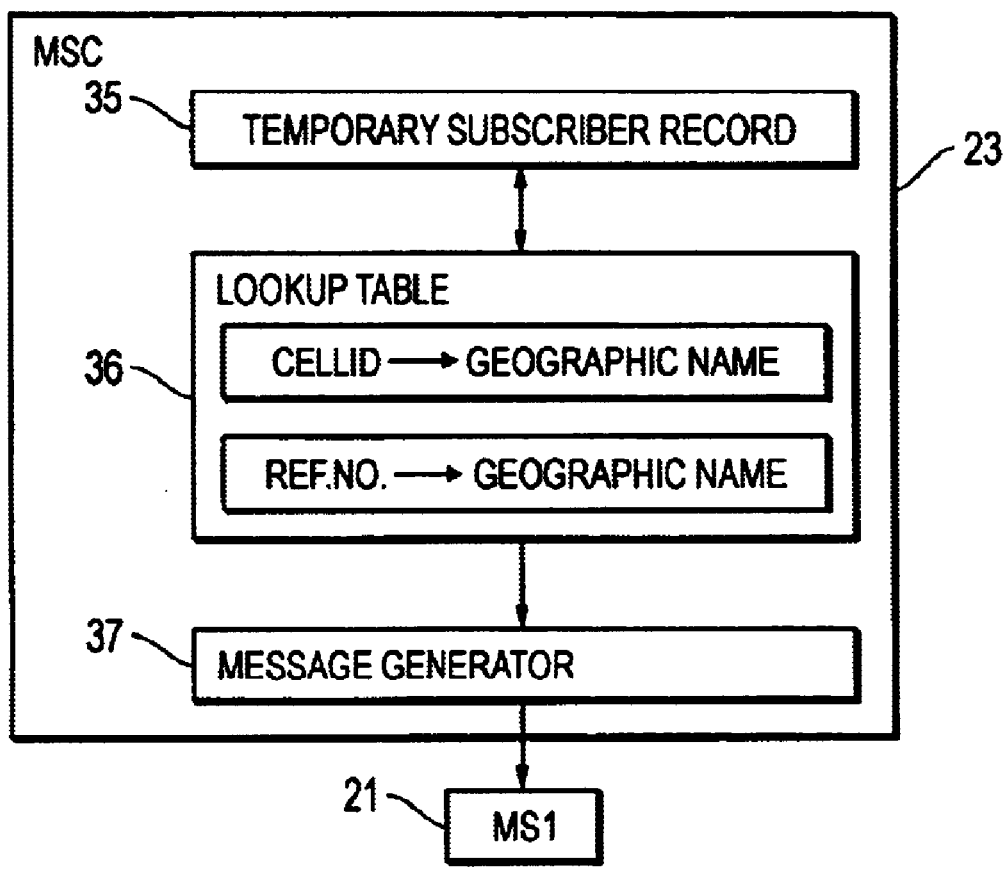
FIG. 3 is a simplified block diagram illustrating the modifications to a Mobile Switching Center (MSC) to implement an embodiment of an MSLS system.

FIG. 3 is a simplified block diagram illustrating the modifications to a Mobile Switching Center (MSC) 23 to implement an embodiment of an MSLS system. For calls within the service area of a single MSC, the MSLS system may be implemented within the MSC. In addition, cell changes during an ongoing call may not be reported by the MSC to the HLR 10 until a final location is reported when the call is completed. The subscriber profile 11 is downloaded from the HLR 10 to a temporary subscriber record 35 in the MSC for each MS that registers and starts to make or receive calls. When a *LOC query is received in the MSC from one of the MSs operating in the MSC's service area (for example MS1), and location information is requested for another MS operating in the MSC's service area (for example MS2), the MSC determines that MS2 is operating in the MSC, that *LOC is activated for MS2, and that MS1 is authorized to receive MS2's location information. A lookup table 36 is implemented in the MSC to convert the current serving CellID to a geographic location. The MSC then utilizes a message generator 37 to respond to the *LOC query with either an SMS message or a voice announcement, as appropriate, sending the location information and time of last update to MS1.

The lookup table 36 may also be implemented to work with the HLR 10 in the scenario illustrated in FIG. 2. For example, the signaling protocol utilized between the MSC 23 and the HLR 10 may not support directly sending the geographic name from the HLR to the MSC in alphabetical form. In this case, the HLR may return a reference number to the MSC which utilizes the lookup table to convert the reference number to a common geographic name. The MSC then returns the common geographic name to the calling subscriber.

Figure 4:
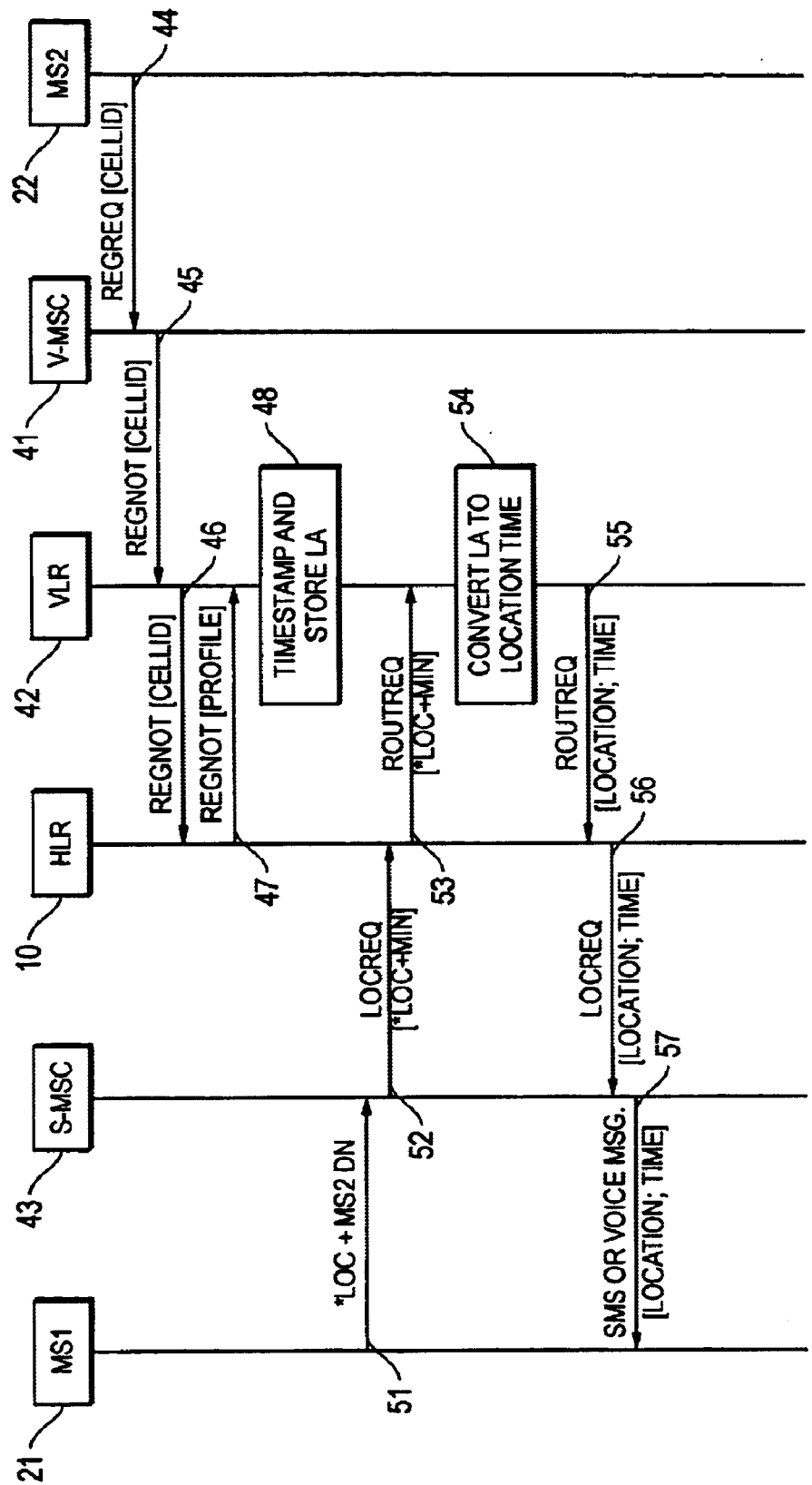
FIG. 4 is a signaling diagram illustrating the steps of the MSLS method when MS2 has roamed to a visited MSC.

FIG. 4 is a signaling diagram illustrating the steps of the MSLS method when MS2 has traveled to another city. In this scenario, MS2 is served by a Visited MSC (V-MSC) 41 which may be co-located with a Visitor Location Register (VLR) 42. The VLR includes functionality similar to the HLR 10. MS2's subscriber profile is stored in the HLR. MS1, which requests location information for MS2, is operating in the service area of a Serving MSC (S-MSC) 43.

At 44, MS2 22 registers with the radio network by sending, for example, a Registration Request (RegReq) message to the V-MSC 41. At 45, the V-MSC forwards the RegReq message to the VLR 42 and includes the CellID for the cell in which MS2 is operating. At 46, the RegReq message is forwarded to the HLR 10 which returns the subscriber profile information to the VLR at 47. At 48, the VLR timestamps and stores the location area (LA) for MS2 in its location register. If MS2 travels to another city, the location information provided to the calling party may indicate only the city where MS2 is located since the names of neighborhoods or suburbs may be meaningless to a caller from a distant city. Therefore information from the stored LA is sufficient, and the accuracy of the CellID is not required. Thus, no paging is required.

At some later time, as indicated at step 51, the subscriber using MS1 21 enters *LOC and the directory number for MS2 22. This message also includes an identifier for MS1 such as its ESN or its MIN. The S-MSC 43 sends a LocReq Invoke message 52 to the HLR 10 requesting location information. The LocReq message includes a *LOC parameter, the digits dialed, and may also include the identity of the calling MS1. At 53, the HLR sends a Routing Request (RouteReq) message to the VLR 42 and includes the *LOC parameter and the MINs for MS1 and MS2. The VLR uses the MIN for MS2 to identify the subscriber profile where it finds that the *LOC service is activated. The MIN for MS1 is utilized to determine that the calling MS1 is authorized to receive MS2's location information. Therefore, at 54, the VLR uses its lookup table to convert the LA for MS2 to a geographic location name.

At 55, the VLR 42 sends a RouteReq Return Result message to the HLR 10 and includes MS2's geographic location information and the time of the last location update. At 56, the HLR sends a LocReq Return Result message to the S-MSC 43 and also includes the geographic location information and the time of the last location update. At 57, the S-MSC sends the location information and the time of the last location update to MS1 21 in either an SMS message or a voice announcement, as appropriate.

Alternatively, the VLR 42 may utilize the MSC Identification number (MSCID) for the V-MSC 41 rather than the LA to enter the lookup table and determine the geographic name of MS2's location. In another alternative, the VLR may return the MSCID to the HLR 10, and the HLR may use the MSCID and its lookup table to determine the geographic name of MS2's location. Thus, when the MS is located in an MSC that is not associated with the HLR, the HLR may receive only an MSCID in response to a *LOC query.

It should be recognized that within the scope of the present invention, the functions of receiving the location query, determining the location of the called MS, converting the location of the called MS to a corresponding common geographic name, and returning the common geographic name to the calling subscriber can be performed in a single network node such as an MSC, a stand-alone network node, or may be performed in several network nodes such as an MSC, an HLR, a Service Control Point (SCP), and an SMS Message Center (MC). Such nodes may communicate with the MSC and the HLR using proprietary signaling or signaling based on ANSI-41. The exact implementation may be determined by the needs of each specific operator or manufacturer.

EXAMPLE

A typical example of how the MSLS service can be utilized is when a husband and wife subscribe to the service, and the husband travels with his MS from Dallas to Montreal via Chicago. The husband normally keeps his mobile station on, but has to turn it off when he boards an aircraft. If the wife wants to check her husband's progress without bothering him, she enters *LOC and his telephone number on her telephone. If he is still in Dallas, or is enroute to Chicago, she receives a message indicating for example "DALLAS" or "DFW AIRPORT" with the time of the last registration. If the age of the report is more than 10 to 15 minutes old (a typical time period between periodic registration updates), she can conclude that her husband is enroute to Chicago. When he arrives in Chicago and activates his mobile station, it registers with a Chicago V-MSC. If his wife checks his status then, she may receive a location message indicating "CHICAGO" or "O'HARE AIRPORT" and an age report of less than 10 to 15 minutes. Likewise, she can check to see that her husband ultimately arrived safely in Montreal by entering *LOC and his telephone number, and receiving a location message indicating "MONTREAL" or "DORVAL AIRPORT".

On her husband's return trip, she may be picking him up at the airport. He may be scheduled on a 5:00 p.m. flight from Chicago which arrives in Dallas at 7:00 p.m. Before she leaves the house at 6:30, she enters *LOC and her husband's phone number to check her husband's location. If the location message indicates "CHICAGO" or "O'HARE AIRPORT" with a last update time of approximately 5:00 p.m., she knows that her husband boarded his plane in Chicago, and turned off his MS, on time. If the message indicates "CHICAGO" or "O'HARE AIRPORT" with an update time of 6:00 p.m., she knows the plane is approximately an hour late. If the message indicates "CHICAGO" or "O'HARE AIRPORT" with an update time that is only a few minutes old, then she knows that her husband is still in Chicago, and she may choose to call him.

It should be noted that the mobile device does not need to be a mobile telephone. For the present invention, the mobile device only needs to be able to send registration request messages so that its location can be updated in the VLR or HLR. Therefore a two-way pager or other small device may be utilized. Business personnel who do not carry mobile phones or pagers may carry a small device that operates in the proper cellular or Personal Communications System (PCS) frequency band and periodically registers with the network. They merely need to turn it on whenever they are not onboard an aircraft in order to enable their office to keep track of where they are.

It should also be noted that only signaling and computational resources are utilized within the cellular network to implement the MSLS service. No voice channels are required and in most cases, no paging channels are required. By charging a fee to perform a location query, or by charging a flat subscription rate, system operators can, therefore, earn revenue from the signaling side of the network. As long as the charge is less than the charge for a phone call, there is tremendous motivation for subscribers to use the service. The revenues generated from location queries should far exceed whatever revenues may be lost if a calling subscriber decides not to place a call that is long distance.

Figure 5:
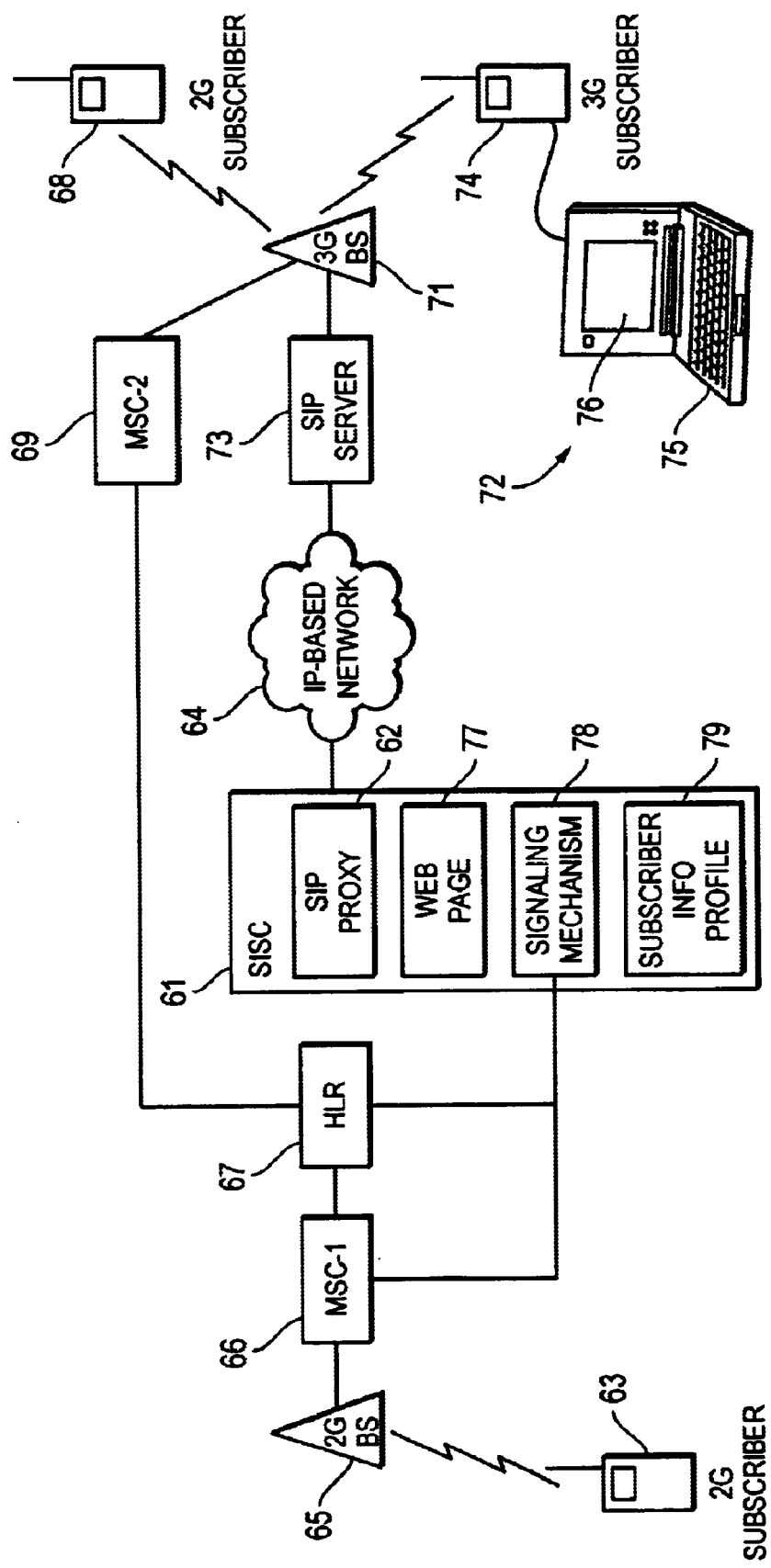
FIG. 5 is a simplified block diagram of an exemplary network-level implementation of the Subscriber Information Service Center (SISC) of the present invention.

FIG. 5 is a simplified block diagram of an exemplary network-level implementation of the Subscriber Information Service Center (SISC) 61 of the present invention. Wireless telecommunication networks are evolving from second generation (2G) circuit-switched networks to third generation (3G) packet-switched networks, and the SISC enables both 2G and 3G subscribers to access the location and status information for other subscribers, and enables information for both 2G and 3G subscribers to be reported.

The SISC 61 may be implemented in a pure 2G environment, a pure 3G environment, or in a mixed 2G and 3G environment. For pure 2G networks and mixed 2G and 3G networks, a Session Initiation Protocol (SIP) proxy 62 is implemented in the SISC so that both 2G and 3G subscribers can have access to information about each other. The SIP proxy includes a SIP-based User Agent Server (UAS) proxy and a virtual User Agent Client (UAC) proxy that acts on behalf of 2G subscribers. The SIP proxy interfaces with the 2G Subscriber 63 utilizing a 2G circuit-switched protocol, and with a connectionless packet-switched network such as an Internet Protocol (IP)-based network 64 using the SIP protocol.

The SIP proxy provides the 2G Subscriber with a SIP Uniform Resource Locator (URL) and a SIP interface allowing the 2G Subscriber to register with the SIP proxy, and to be notified about events in the IP-based network. The SIP interface maps the circuit-switched protocol into SIP, thereby making the 2G Subscriber appear as a 3G subscriber to the IP-based network. Any SIP client can send and receive data from other SIP clients and SIP servers. The SIP protocol enables this to happen in a seamless fashion. The SISC 61 also has a SIP URL, and a Web page 77 is set up at the SISC. Subscribers can access the Web page to obtain location information and other status information about other designated subscribers. E-mail messages can also be exchanged. It should be recognized, that while the preferred embodiment is described herein in terms of the SIP protocol, other packet-switched protocols may also be utilized within the scope of the present invention.

FIG. 5, the 2G Subscriber 63 communicates through a 2G Base Station (BS) 65 to a first MSC (MSC-1) 66. In some networks, the MSC-1 may be divided into an MSC server for handling control signaling, and a Media Gateway (MGW) for handling media payload. An HLR 67 stores subscriber profiles and location information for mobile subscribers. The MSLS system may be implemented in the MSC-1, the HLR, or both as described above. The SISC 61 may be co-located with the HLR, or it may be implemented as a stand-alone application, and may communicate through a signaling mechanism 78 with the HLR using proprietary signaling or ANSI-41-based signaling. The SISC may also communicate through the signaling mechanism with MSC-1 66 using, for example, ANSI-41-based signaling. Status information related to ongoing calls within MSC-1 can be requested by the SISC for presentation on the Web page 77 to a requesting subscriber.

Control signaling to set up a pure 2G call destined for a 2G mobile subscriber 68 in another MSC is routed from the HLR to MSC-2 69. A 3G BS 71 which is also 2G capable is used to connect the call to the 2G Subscriber. Calls destined for a 3G Subscriber 72 are routed through the SIP proxy 62 to the IP-based network 64. A SIP Server 73 routes the call through the 3G BS to the 3G Subscriber. The 3G Subscriber 72 may utilize a mobile terminal (MT) comprising a mobile phone 74 and a laptop computer 75 having a display 76.

Figure 6:
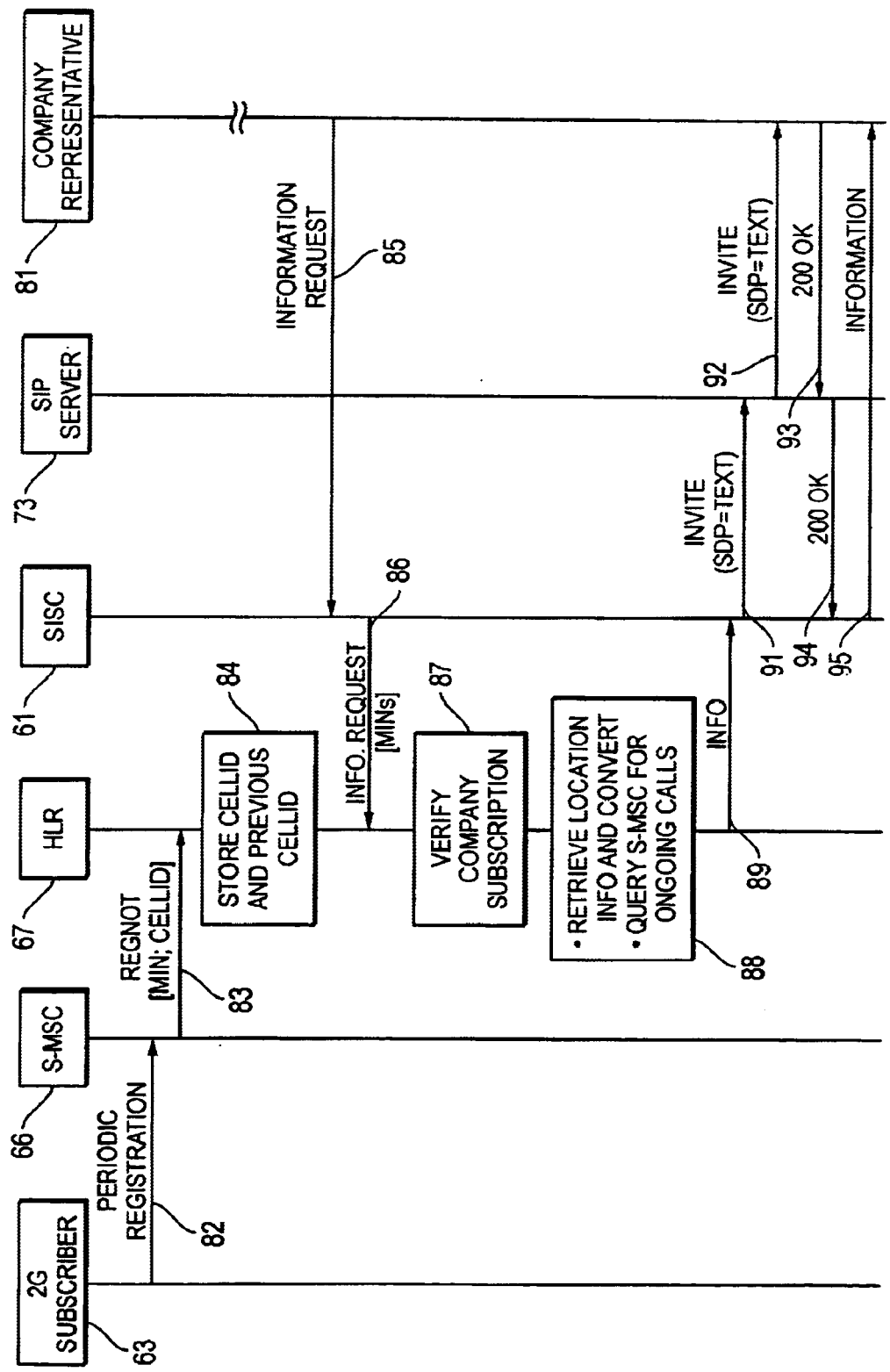
FIG. 6 is a signaling diagram illustrating the flow of signals between the nodes of the network of FIG. 5 when performing one embodiment of the method of the present invention.

FIG. 6 is a signaling diagram illustrating the flow of signals between the nodes of the network of FIG. 5 when performing one embodiment of the method of the present invention. In the illustrated example, the 2G mobile subscriber 63 is an employee of a company that has a subscription enabling a Company Representative 81 to obtain location and status information from the SISC 61 relating to designated employees. For example, a courier company may use the system to track its drivers on their routes. The identification of the employees, and the location and status information desired by the company, may be stored in a company subscriber information profile 79 in the SISC.

At 82, the 2G Subscriber 63 performs a periodic registration with the S-MSC 66. The S-MSC sends a Registration Notification (REGNOT) message 83 to the HLR 67 and includes the 2G Subscriber's MIN and location (for example, the CellID where the 2G Subscriber is currently located). At 84, the HLR stores this information along with the CellID of the previous location of the 2G Subscriber.

At some later time, the Company Representative 81 sends a request for information 85 to the SISC 61. This may be done from a PC or 3G mobile terminal using Hypertext Transfer Protocol (HTTP) to request the SISC to obtain the information for the MINs that are in the company's profile 79. At 86, the SISC requests updated information from the HLR 67. The HLR may periodically refresh the information in the SISC in order to minimize the amount of information that must be updated.

The HLR 67 verifies the company's subscription at 87, and at 88 the HLR retrieves the location information for the MINs in the company's profile 79 and uses the lookup table 36 (FIG. 3) to convert the information to common geographic names. Alternatively, the lookup table may be implemented in the SISC, and the conversion may be performed after the CellIDs or Location Area IDs are received from the HLR. If the company's profile 79 indicates that the company also wants to know whether any of the employees are currently engaged in ongoing calls, the HLR may query the S-MSC for each employee MIN for this information.

When all of the information is gathered, the HLR 67 sends the information to the SISC 61 at step 89. The information may be presented to the Company Representative on the SISC Web page, or it may be sent to the Company Representative in an e-mail message, an SMS message, or a voice announcement. The company profile may designate a preferred communication method. To establish the connection, the SISC sends a SIP Invite message 91 to the SIP Server 73 with the Session Description Protocol (SDP)=text. The SDP identifies media types and applications during the setup of the session so that the two parties to a SIP session can properly configure themselves to handle the proposed session. The SIP Server forwards the Invite message to the Company Representative at 92. The Company Representative returns a SIP 200 OK message 93 to the SIP Server which forwards the 200 OK message to the SISC at 94. The SISC then sends the information at 95. Alternatively the information may be sent in an SMS message or voice announcement.

FIG. 7 is an illustrative drawing of an exemplary display providing a subscriber with location and other status information on a plurality of designated mobile subscribers. The display may be, for example, the display 76 on the 3G Subscriber's laptop computer 75. In the illustrated example, a company has equipped a plurality of its employees with mobile terminals. The MINs or other identifying information for each employee's terminal have been entered into the subscriber information profile 79 for the company as being designated subscribers for providing location and other status information. This information is shared between the HLR 67 and the SISC 61.

When the Company Representative accesses the SISC Web site, the Representative is presented with a list of the designated company employees 101. For each employee, the list indicates information such as the geographic name of the current cell or location area where the employee is located 102, and the time of the last location update 103. The SISC has continuous access to the location information for each employee, and therefore, the display may also indicate the previous cell location 104 prior to the current location. This can give the Company Representative an idea of which direction the employee is moving. By using simple logic, the SISC can also indicate whether the employee is moving or stationary at 105. For example, the SISC may determine that the employee is moving if the time since the employee changed cells is less than a predefined threshold. Thus, if the cell location has changed within the last ten minutes, for example, then the SISC may indicate that the employee is moving. Otherwise, the employee is listed as stationary. The employee's serving MSC or SIP Server may also send information to the SISC indicating when the employee is engaged in an ongoing call. This information can also be provided on the display at 106. Additionally, the HLR receives power-up and power-down registration messages from all of the mobile terminals that are registered with it. Therefore, the SISC may retrieve this status information from the HLR and indicate to the Company Representative whether or not each employee's mobile terminal is active or inactive. The company can designate an information profile ahead of time, and when a request for information is received in the SISC, the SISC requests the appropriate information from the HLR and/or the serving MSC for each employee.

As noted above, 3G subscribers and 2G subscribers using the SIP proxy have SIP URLs and can send requests to the SISC Web site, and can receive e-mail messages from the SISC Web site. This enables the Company Representative, for example, to enter a request that the SISC notify the representative when a particular employee enters a designated location. The notification may be sent by e-mail, by voice announcement, or by other mechanisms such as an SMS message. Likewise, an employee can enter a request that the SISC automatically notify the Company Representative when the employee enters a designated location. Once again, the notification may be sent by e-mail, by voice announcement, or by other mechanisms such as an SMS message.

It is thus believed that the operation and construction of the present invention will be apparent from the foregoing description. While the method, apparatus and system shown and described has been characterized as being preferred, it will be readily apparent that various changes and modifications could be made therein without departing from the scope of the invention as defined in the following claims.

What is claimed is:

1. A system in a wireless telecommunications network for providing a first subscriber with location information for a mobile subscriber, said system comprising:

means within the network for receiving an information request from the first subscriber, said information request requesting location information for the mobile subscriber, wherein the mobile subscriber is utilizing a standard mobile station;

means within the network for determining a location for the mobile subscriber, said means for determining a location indicating a cell identification (CellID) where the mobile subscriber's mobile station is located whenever the mobile station is in a location that is local to the first subscriber, and said means for determining a location indicating a Mobile Switching Center Identification (MSCID) where the mobile subscriber's mobile station is located whenever the mobile station is in a location that is non-local to the first subscriber;

means within the network for converting the indicated location for the mobile station to a corresponding common geographic name; and means for posting the common geographic name on a Web page accessible by the first subscriber to retrieve the location information, said Web page being associated with a Subscriber Information Service Center (SISC) that retrieves the requested information from a Home Location Register (HLR), wherein the SISC compiles the requested information in accordance with instructions in a subscriber profile for the first subscriber.

2. The system for providing a first subscriber with location information for a mobile subscriber of claim 1 wherein the means for receiving the information request from the first subscriber includes means for receiving an e-mail message from the first subscriber requesting the information.

3. The system for providing a first subscriber with location information for a mobile subscriber of claim 1 wherein the system determines and reports location information for a plurality of subscribers requested by the first subscriber.

4. A system in a wireless telecommunications network X for providing a first subscriber with location information for a mobile subscriber, said system comprising:

means within the network for receiving an information request from the first subscriber, said information request requesting location information for the mobile subscriber, wherein the mobile subscriber is utilizing a standard mobile station;

means within the network for determining a location for the mobile subscriber, said means for determining a location indicating a cell identification (CellID) where the mobile subscriber's mobile station is located whenever the mobile station is in a location that is local to the first subscriber, and said means for determining a location indicating a Mobile Switching Center Identification (MSCID) where the mobile subscriber's mobile station is located whenever the mobile station is in a location that is non-local to the first subscriber means within the network for converting the indicated location for the mobile station to a corresponding common geographic name; and means for posting the common geographic name on a Web page accessible by the first subscriber to retrieve the location information, said Web page being associated with a Subscriber Information Service Center (SISC) that retrieves the requested information from a Home Location Register (HLR), wherein the SISC posts on the Web page, the common geographic name of the location of the mobile station, as reported in a most recent location update.

5. The system for providing a first subscriber with location information for a mobile subscriber of claim 4 wherein the SISC also posts on the Web page, a time at which the most recent location update was performed.

6. The system for providing a first subscriber with location information for a mobile subscriber of claim 5 wherein the SISC also posts on the Web page, the common geographic name of the location of the mobile station immediately prior tote most recent location update.

7. The system for providing a first subscriber with location information for a mobile subscriber of claim 4 wherein the SISC includes logic that determines that the mobile station is moving if a time since the mobile station changed cells is less than a predefined threshold.

8. The system for providing a first subscriber with location information for a mobile subscriber of claim 7 wherein the SISC also posts on the Web page, an indication of whether the mobile station is moving or stationary.

9. The system for providing a first subscriber with location information for a mobile subscriber of claim 4 wherein the SISC includes a signaling mechanism that requests a mobile switching center (MSC) serving the mobile station to report whether the mobile station is engaged in an ongoing call.

10. The system for providing a first subscriber with location information for a mobile subscriber of claim 9 wherein the SISC also posts status information for the mobile subscriber on the Web page, said status information including an indication of whether the mobile station is currently engaged in an ongoing call.

11. The system for providing a first subscriber with location information for a mobile subscriber of claim 4 wherein the SISC also retrieves status information from the HLR relating to whether the mobile subscriber's mobile station is active or inactive, and posts the status information on the Web page.

12. The system for providing a first subscriber with location information for a mobile subscriber of claim 4 wherein the system determines and reports location information for a plurality of subscribers requested by the first subscriber.

13. A system in a wireless telecommunications network for providing a first subscriber with location information for a mobile subscriber, said system comprising:
   means within the network for receiving an information request from the first subscriber, said information request requesting location information for the mobile subscriber, wherein the mobile subscriber is utilizing a standard mobile station;
   means within the network for determining a location for the mobile subscriber, said means for determining a location indicating a cell identification (CellID) where the mobile subscriber's mobile station is located whenever the mobile station is in a location that is local to the first subscriber, and said means for determining a location indicating a Mobile Switching Center Identification (MSCID) where the mobile subscriber's mobile station is located whenever the mobile station is in a location that is non-local to the first subscribe;
   means within the network for converting the indicated location for the mobile station to a corresponding common geographic name; and
   means for posting the common geographic name on a Web page accessible by the first Information Service Center (SISC) that retrieves the requested information from a Home Location Register (HLR),
   wherein the SISC includes a proxy device that provides an address usable in a packet-data network to the first subscriber, and that maps circuit-switched signaling used by the first subscriber into packet-switched signaling used by the packet-switched network.

14. The system for providing a first subscriber with location information for a mobile subscriber of claim 13 wherein the system determines and reports location information for a plurality of subscribers requested by the first subscriber.

15. A method in a wireless telecommunications network of providing a first subscriber with location information for a mobile subscriber, said method comprising the steps of:
   receiving in the network, an information request from the first subscriber, said information request requesting location information for the mobile subscriber, wherein the mobile subscriber is utilizing a standard mobile station;
   determining within the network, a location for the mobile subscriber's mobile station, said determining step including the steps of:
      indicating a cell identification (CellID) where the mobile station is located whenever the mobile station is in a location that is local to the first subscriber and
      indicating a Mobile Switching Center Identification (MSCID) where the mobile station is located whenever the mobile station is in a location that is non-local to the first subscriber; retrieving by a Subscriber Information Service Center (SISC), the requested information from a Home Location Register (HLR);
   converting the location for the mobile station to a corresponding common geographic name;
   compiling the requested information by the SISC in accordance with instructions in a subscriber profile for the first subscriber; and
   posting the common geographic name on a Web page that is accessed by the first subscriber to retrieve the location information.

16. The method of providing a first subscriber with location information for a mobile subscriber of claim 15 wherein the method is performed without requiring the first subscriber to originate a telephone call.

17. The method of providing a first subscriber with location information for a mobile subscriber of claim 15 wherein the step of receiving the information request from the first subscriber includes receiving an e-mail message from the first subscriber requesting the information.

18. A method in a wireless telecommunications network of providing a first subscriber with location information for a mobile subscriber, said method comprising the steps of:
   receiving in the network, an information request from the first subscriber, said information request requesting location information for the mobile subscriber, wherein the mobile subscriber is utilizing a standard mobile station;
   determining within the network, a location for die mobile subscriber's mobile station, said determining step including the steps of:
      indicating a cell identification (CellID) where the mobile station is located whenever the mobile station is in a location that is local to the first subscriber; and
      indicating a Mobile Switching Center Identification (MSCID) where the mobile station is located whenever die mobile station is in a location that is non-local to the first subscriber;
   retrieving by a Subscriber Information Service Center (SISC), the requested information from a Home Location Register (HLR):
   converting the location for the mobile station to a corresponding common geographic name; and
   posting on a Web page that is accessed by the first subscriber to retrieve the location information, the common geographic name of the location of the mobile station, as reported in a mast recent location update.

19. A method in a wireless telecommunications network of providing a first subscriber with location information for a mobile subscriber, said method comprising the steps of:
receiving in the network, an information request from the first subscriber, said information request requesting location information for the mobile subscriber, wherein the mobile subscriber is utilizing a standard mobile station;
determining within the network, a location for the mobile subscriber's mobile station, said determining step including the steps of:
indicating a cell identification (CellID) where the mobile station is located whenever the mobile station is in a location that is local to the first subscriber, and
indicating a Mobile Switching Center Identification (MSCID) where the mobile station is located whenever the mobile station is in a location that is non-local to the first
periodically sending the requested information from a Home Location Register (HLR) to a Subscriber Information Service Center (SISC);
converting the location for the mobile station to a corresponding common geographic and
posting on a Web cage that is accessed by the first subscriber to retrieve the location information, the common geographic name of the location of the mobile station, as reported in a most recent location update.

20. A Subscriber Information Service Center (SISC) in a wireless telecommunications network having a Mobile Switching Center (MSC) serving a mobile subscriber utilizing a standard mobile station and a Home Location Register (HLR) storing location information for the mobile subscriber, said SISC providing location and status information about the mobile subscriber to a requesting subscriber, said SISC comprising:
a first signaling mechanism for receiving a request for information about the mobile subscriber from the requesting subscriber and posting the requested information on a Web site that is accessed by the requesting subscriber to retrieve the information a second signaling mechanism for retrieving location information for the mobile subscriber's mobile station from the HLR, said second signaling mechanism retrieving a cell identification (CellID) where the mobile station is located whenever the mobile station is in a location that is local to the requesting subscriber, and retrieving a Mobile Switching Center Identification (MSCID) where the mobile station is located whenever the mobile station is in a location that is non-local to the requesting subscriber;
means for compiling the requested information in accordance with instructions in a subscriber profile for the first subscriber; and
a location conversion mechanism that converts the CellID or the MSCID to a corresponding common geographic name prior to posting the requested information on the Web site.

21. The SISC of claim 20 wherein the first signaling mechanism includes means for receiving the request for information in a first e-mail message, and sending the requested information to the requesting subscriber in a second e-mail message.

22. The SISC of claim 20 further comprising a database that stores the subscriber profile for die requesting subscriber, said profile indicating the location and status information desired by the requesting subscriber.

23. The SISC of claim 22 wherein the profile includes an indication that the requesting subscriber desires information for a plurality of mobile subscribers, and the SISC retrieves information for the plurality of mobile subscribers and posts the information on the Web site for retrieval by the requesting subscriber.

24. The SISC of claim 20 further comprising a proxy device that provides an address usable in the packet-data network to the first subscriber, and that maps circuit-switched signaling used by the first subscriber into packet-switched signaling used by the packet-switched network, thereby enabling the first subscriber to request information for the mobile subscriber when the first subscriber is a second-generation (2G) mobile subscriber.

25. The SISC of claim 20 wherein the second signaling mechanism includes means for retrieving from the MSC, status information relating to an ongoing call by the mobile subscriber.

26. A Subscriber Information Service Center (SISC) in a wireless telecommunications network having a Mobile Switching Center (MSC) serving a mobile subscriber utilizing a standard mobile station and a Home Location Register (HLR) storing location information for the mobile subscriber, said SISC providing location and status information about the mobile subscriber to a requesting subscriber, said SISC comprising:
a first signaling mechanism for receiving a request for information about the mobile subscriber from the requesting subscriber and posting the requested information on a Web site that is accessed by the requesting subscriber to retrieve the information;
a second signaling mechanism for retrieving location information for the mobile subscriber's mobile station from the HLR, said second signaling mechanism retrieving a cell identification (CellID) where the mobile station is located whenever the mobile station is in a location that is local to the requesting subscriber, and retrieving a Mobile Switching Center Identification (MSCID) where the mobile station is located whenever the mobile station is in a location that is non-local to the requesting subscriber;
a location conversion mechanism that converts the CellID or the MSCID to a corresponding common geographic name prior to posting the requested information on the Web site, and
a proxy device that provides an address usable in a packet-data network to the first subscriber, and that maps circuit-switched signaling used by the first subscriber into packet-switched signaling used by the packet-switched network.

* * * * *